2,948,691

HIGH MOLECULAR WEIGHT POLYETHER URETHANE POLYMERS

Erwin Windemuth, Hermann Schnell, and Otto Bayer, Leverkusen, Germany, assignors, by direct and mesne assignments, of one-half to Mobay Chemical Company, St. Louis, Mo., a corporation of Delaware; and one-half to Farbenfabriken Bayer Aktiengesellschaft, Leverkusen Bayerwerk, Germany, a corporation of Germany No Drawing. Filed May 6, 1952, Ser. No. 286,425

Claims priority, application Germany May 10, 1951

28 Claims. (Cl. 260—2.5)

The present invention relates to high molecular weight polymers and to a process of producing same.

It is known in the art to produce polyglycolethers having one or more terminal hydroxyl groups by polymerizing alkylene oxides, for instance ethylene oxide, or by chemical addition of alkylene oxides to mono- or polyfunctional alcohols such as stearyl alcohol, ethylene glycol, trimethylolpropane, pentaerythrite etc. These polyglycolethers are generally soluble in water and organic solvents, except in aliphatic and cycloaliphatic hydrocarbons such as gasoline and cyclohexane. The molecular weight of these products varies depending on their mode of preparation.

In accordance with the present invention we have found that polyglycolethers of a molecular weight of at least 500, which have at least two terminal hydroxyl groups can be reacted with mono- or polyfunctional aliphatic or aromatic isocyanates. The reaction results in novel products which may be used for producing plasticizers, lubricants, plastics, spongy materials, gel formers, thickening agents, auxiliaries in textile industry, and the like.

In the above reaction polymers or addition products of alkylene oxides may be used as polyglycolethers. Examples of isocyanates are the aliphatic and aromatic monoisocyanates such as chlorohexyl isocyanate, phenyl isocyanate, and the appropriate polyfunctional isocyanates such for example as hexamethylene diisocyanate, naphthalene-1,5-diisocyanate, toluylene diisocyanate, 4,4'-diphenylmethane diisocyanate, 1,4-phenylene diisocyanate, and 4,4'-diphenyldiisocyanate. Depending on the polyglycolether and the nature and quantity of the isocyanate used in the reaction, products are obtained which, as compared with the starting material, show modified properties and open new fields of application.

Thus, for instance, the reaction of polyglycolethers and aromatic or aliphatic monoisocyanates—depending on the molecular weight of the polyglycolether and the nature and quantity of the isocyanate—gives rise to products which are either insoluble in water, however, soluble in organic solvents or which dissolve in cold water but not in hot water. The products may be used as plasticizers and lubricants, furthermore as emulsifiers if long-chain aliphatic isocyanates, for instance, stearyl isocyanate, were used for their manufacture. In some cases, especially when working with aromatic isocyanates, chemical addition of the isocyanates to the hydroxyl groups occurs with selfheating on contacting the components. It is possible in all cases to convert all the hydroxyl groups into urethane groups at higher temperatures; if volatile isocyanates are present the reaction may be carried out by application of pressure.

By reacting polyglycolethers containing two hydroxyl groups in the molecule and polyfunctional, for instance bifunctional, isocyanates, products are obtained with an increase in molecular weight, which are of resinous character or thermoplastic. Products of this type dissolve in organic solvents, except in aliphatic hydrocarbons. Products produced in the reaction of polyglycolethers of a relatively low molecular weight and diisocyanates are generally insoluble in water but soluble in organic solvents. Products derived from polyglycolethers of high molecular weight, however, dissolve in water and organic solvents. Due to their compatibility with many natural or synthetic polymeric substances and their non-volatility the products may advantageously be used as addition for lacquers and plastics.

The reaction of polyglycolethers having three or more terminal hydroxyl groups with equivalent amounts of polyfunctional isocyanates results in cross-linked insoluble plastics. The properties of these plastics substantially depend on the starting materials used for their preparation. As a rule, hard products are obtained at room temperature when the starting materials have a high degree of cross-linkage whereas products of rubber elastic properties are obtained when the starting materials have a low degree of cross-linkage. Hard products are preferably prepared from polyglycolethers of a low molecular weight, say about 500 to 1000, whereas polyglycolethers of a high molecular weight, say about 3000–15000, are employed for preparing elastomers. The plastics are of interest because of their swelling properties. For instance, it is possible according to the invention to prepare rubber elastic products which are completely indifferent in aliphatic hydrocarbons, however, swell in contact with water.

When using polyfunctional isocyanates in quantities smaller than the equivalent ones a partial increase only in molecular weight occurs. The isocyanate modified polyglycolethers thus obtained still contain free hydroxyl groups. Depending on the quantity of the polyisocyanate added, it is possible to prepare in this way, like in the reaction of bi-functional polyglycolethers, products which dissolve in water and organic solvents, or which are soluble in organic solvents but insoluble in water. Another possibility of variation consists in the supplementary use of aliphatic or aromatic monoisocyanates which are reacted with the residual hydroxyl groups. In the reverse order, the polyglycolethers can partially be reacted first with monoisocyanates and, thereafter, follows the reaction of the rest of the hydroxyl group with polyfunctional isocyanates. The soluble representatives of this class of compounds may be used for a great number of applications. They are suitable for instance as thickening agents, assistants in textile industry, plasticizers for lacquers and plastics, impregnating agents for wood, and addition products in the manufacture of lead for pencils.

Products of considerable importance are obtained by reacting polyfunctional polyglycolethers and polyfunctional isocyanates in quantities larger than those required for saturating the hydroxyl groups present. In this way, isocyanate modified polyglycolethers can be obtained by applying twice the equivalent amount of polyfunctional isocyanates. These isocyanate modified polyglycolethers contain free isocyanate groups in the molecule and are suitable for numerous further reactions because of the high reactivity of the free NCO groups. The reaction of said products with water may be mentioned by way of example by causing water in form of atmospheric moisture to act at room temperature on thin layers of isocyanate modified polyglycolethers, insoluble films or foils are obtained within a longer or shorter period, depending on the reactivity of the isocyanate employed; the reaction of naphthalene-1.5-diisocyanate at 50 percent of relative atmospheric moisture is complete after about 2 hours. The films or foils thus obtained may have paper-like or rubber-elastic properties; they are distinguished by a remarkable swelling behavior. Complete indifference in aliphatic hydrocarbons renders the new products suitable for application in this fields in the art where such property is required, for instance in the coating of gasoline tubes or storage tanks for gasoline. The capability of the new products of swelling in water can be utilized if counter-stresses are required of support materials such as paper, fabrics, and films of high polymeric plastics, to which the films or foils are applied, in contact with water or atmospheric moisture. The swelling of the layer consisting of isocyanate modified polyglycolether on said base materials causes in many cases the material to vault to a larger or lesser extent, thus compensating any counter-stresses. The aforesaid refers, for instance, to carbon paper for typewriters which by suitable treatment with the new products is prevented from being rolled up.

Isocyanate modified polyglycolethers, especially those having a molecular weight higher than 2000, are soluble in water. Solutions thus prepared, however, are not stable because of the high reactivity of the isocyanate group in water. Thickening or gel formation with the increase in molecular weight occurs within intervals of some minutes depending on the solid content of the solution. A proportion of 4 percent of an isocyanate modified polyglycolether prepared from a polyglycolether of a molecular weight of 4030 which is obtained by addition of ethylene oxide to trimethylolpropane, suffices to form a gelatinous mass. The use of smaller quantities results in the thickening of the solution.

The cross-linking by carbamide groups is accompanied with the evolution of carbon dioxide. Such course of reaction may be utilized in the manufacture of cellular materials. Isocyanate modified polyglycolethers are intimately mixed with the amount of water sufficient for reacting the excess isocyanate present, preferably in the presence of alkaline media, for instance, alkali phenolates or more preferably tertiary amines, in quantities of about 2 percent calculated on the isocyanate modified polyglycolethers, optionally with the aid of an emulsifier. The mass soon expands and solidifies to an insoluble cellular material. Of course, cellular materials can also be produced in a single operation step by starting from polyglycolethers which are reacted with the other components. The invention provides innumerable possibilities of variation owing to the great number of polyglycolethers and polyfunctional isocyanates which may be used as starting materials. Cellular materials of the most different physical properties may be obtained by suitable choice of the reactants. All these materials, however, are distinguished, to a larger or smaller extent, by a marked swelling capacity in water and other solvents. Reaction of isocyanate modified polyglycolethers to form insoluble products may further be carried out with aliphatic or aromatic di- or polyamines. For instance, an insoluble film or coating can be produced on a support by subjecting the isocyanate modified polyglycolether applied to the support to vapors of the above said amines, for instance, ethylene diamine. For instance, diaphragms for gasoline pumps can be produced in this manner.

The isocyanate modified polyglycolethers obtained according to the invention may further be utilized in the manufacture of compact plastics. For this purpose, glycols or polyvalent, primary or secondary, alcohols, furthermore diamines or polyvalent, primary or secondary, amines are preferably employed as cross-linking agents instead of water. Because of the larger proportion of isocyanate and the different arrangement of the isocyanate in the molecular structure the physical properties of the plastics thus prepared differ from those produced from equivalent amounts of polyfunctional isocyanates.

Furthermore, the isocyanate modified polyglycolethers are valuable intermediate products for a number of further reactions. For instance, N,N'-dialkylaminoethanols may be chemically added without difficulties thus forming basic polyglycolethers. These basic polyglycolethers may be rendered quaternary by means of halides whereby new classes of compounds are made accessible. The use of epichlorohydrin gives rise to terminal alkylene oxide groups which may be used for further reactions. Plastics of new properties can be obtained from dihalides, for instance 1.4-dichlorobutene. By chemical addition of fatty alcohols substances having emulsifying properties are obtained. The aforesaid modifications may be named as examples of reactions which provide new classes of compounds. It is, however, by no means intended to restrict the application of isocyanate modified polyglycolethers as intermediate products.

In the reaction of polyglycolethers and polyfunctional isocyanates a too vigorous reaction and insolubilization of the reaction mixture often take place. Such course of reaction easily occurs when polyglycols containing free alkali from their preparation are employed. A too vigorous reaction and insolubilization are safely avoided by carrying out the reaction of polyfunctional polyglycolethers and polyfunctional isocyanates in the presence of acid reacting substances or substances which are capable of forming acid, for instance, by the action of water or heat. Very small quantities of said substances, say less than 0.5 percent, frequently only 0.05 percent calculated on the polyglycolethers, suffice to secure a uniform course of reaction. Suitable substances for this purpose are, for instance, organic and inorganic acid chlorides such as acetyl chloride, propionyl chloride, oxalyl chloride, adipic acid chloride, benzoyl chloride, phosphorus tri- and pentachloride, phosphorus oxychloride, tin tetrachloride, furthermore hydrohalic acids, inorganic acid anhydrides such as sulfur dioxide and sulfur trioxide. Reference may further be made to butadiene sulfone which decomposes into butadiene and sulfur dioxide at higher temperatures. The action of the aforesaid substances is shown in various directions:

(1) They prevent the polymerization of the isocyanate group;

(2) They exert a retarding influence on the speed of reaction between the isocyanate groups and the hydroxyl groups of the polyglycolethers;

(3) The polymerization inhibiting action on the isocyanate groups is preserved in the end or intermediate product, even after completion of the reaction.

The latter point is of importance in respect of the storing capacity of the isocyanate modified polyglycolethers which can be easily handled provided that atmospheric moisture is excluded.

In those cases where the acid substances which inhibit polymerization and retard reaction velocity will interfere in the further reactions, the action of the said substances can be compensated at any time by addition of alkaline agents, for instance, tertiary amines. These alkaline agents may either be incorporated into the isocyanate modified polyglycolethers or may be caused to act on the isocyanate modified polyglycolethers from outside, for instance in the form of gases. For instance, if on a support a film or foil is to be produced from a stabilized isocyanate modified polyglycolether the reaction with the atmospheric moisture can be susbtantially accelerated by contacting the isocyanate modified polyglycolether applied to the support with a gaseous atmosphere, for instance, such containing vapors of hexahydrodimethylaniline.

5

The invention is further illustrated by the following examples without being restricted thereto, the parts being by weight.

Example 1

50 parts of a polyglycolether obtained by chemical addition of 8.5 mols of ethylene oxide to 1 mol of trimethylol propane are reacted with 16.8 parts of hexamethylene diisocyanate at 120° C. for two hours. The melt becomes viscous. A light yellow resin is obtained on cooling which is insoluble in hot and cold water and forms viscous solutions in acetone, benzene, chloroform, and ethyl acetate. The resin may be used as addition agent for lacquers and plastics, for instance those prepared on the basis of nitrocellulose.

Example 2

300 parts of a polyglycolether obtained by addition of 9.5 mols of ethylene oxide to 1 mol of trimethylol propane are reacted with 196 parts of phenyl isocyanate. After completion of the exothermic reaction the mixture is stirred at 150° C. for one hour. The resultant viscous oil (481 parts) is insoluble in water but dissolves in organic solvents. The oil is not volatile and compatible with nitrocellulose, cellulose acetobutyrate, cellulose triacetate, benzyl cellulose, polyvinyl acetate, copolymers of vinyl chloride, and polyvinyl acetate, and may successfully be employed for plasticizing said substances. The reaction product has a flash point of 249° C., the point of ignition is 284° C. The product shows good lubricating properties.

Example 3

300 parts of the polyglycolether described in Example 2 are reacted with 266 parts of 6-chlorohexylisocyanate at 120–150° C. until a homogeneous melt has formed which is stirred at 150° C. for another hour. The excess isocyanate is removed in vacuo by heating. 540 parts of an oil of mean viscosity is obtained which is insoluble in water but soluble in organic solvents. The oil is not volatile and compatible with nitrocellulose, cellulose acetobutyrate, cellulose triacetate benzyl cellulose, chlorinated rubber, polyvinylacetate, copolymers of polyvinylchloride, and polyvinylacetate, and may successfully be employed for plasticizing said products. Furthermore, the oil has good lubricating properties.

Example 4

50 parts of a polyglycolether obtained by addition of 9 mols of ethylene oxide to 1 mol of trimethylol propane are reacted with 34 parts of stearyl isocyanate at 140° C. for 4 hours. The resultant paste forms turbid suspensions in cold water and is insoluble in hot water. The substance may be employed for emulsifying for instance fats, oils, and hydrocarbons in water.

Example 5

Polymeric products of varying solubility properties can be obtained by reacting a polyglycolether prepared from trimethylol propane and ethylene oxide, which has the molecular weight 4030, with hexamethylene diisocyanate. The process of preparing said polymeric product is carried out as follows: 100 parts of the polyglycolether are dehydrated at 150° C. and 1 mm. Hg by treatment in vacuo for one hour, thereupon cooled to 45° C. and 0.25 percent of acetyl chloride is added. 15 minutes after addition of acetyl chloride, hexamethylene diisocyanate is introduced into the melt which is constantly stirred and simultaneously heated to 80° C. After thoroughly mixing the reactants which generally takes about 10 minutes, the mixture is poured into a vessel which may be closed and the reaction is completed in the vessel by heating to 80° C. for 6 hours. The products listed in the following table are obtained by the reaction:

| Product No. | grams of hexamethylene diisocyanate per 100 grams of polyglycolether | viscosity no. $z\eta$ solvents: water | solubility water | solubility methanol |
|---|---|---|---|---|
| 1 | 3.6 | 33.9 | soluble | soluble. |
| 2 | 3.7 | 38.2 | do | Do. |
| 3 | 3.8 | 51.0 | do | Do. |
| 4 | 3.9 | | insoluble in cold, soluble in warm or hot water. | Do. |
| 5 | 4.0 | | | |
| 6 | 4.1 | | | |
| 7 | 4.2 | | | |
| 8 | 4.4 | | insoluble | insoluble. |

All the above isocyanate modified resins are highly viscous, fibre forming masses in the heat; they are tough at room temperature and show a conchoidal structure. Like the polyglycolether used for their preparation all the products are distinguished by complete insolubility in aliphatic hydrocarbons. The aqueous solutions of the products may be employed as textile assistants and for impregnating wood, especially in the preparation of pencils. Furthermore, the products may successfully be used in the preparation of lead for pencils and as plasticizers for plastics and lacquers.

Example 6

The wax of the molecular weight 4030, which is prepared from trimethylol propane and ethylene oxide, is dehydrated as described in Example 5 and acetyl chloride is added. The wax is then mixed with toluylene diisocyanate (6.48 parts per 100 parts of wax), the mixture is cast into a mold wherein the reaction is completed by heating for 6 hours to 100° C. A cross-linked plastic is obtained which is insoluble in water and organic solvents and shows rubber-elastic properties, especially at temperatures above the softening point of the resin used (48° C.). The product is of importance because of its incapability of swelling in aliphatic hydrocarbons and its swelling capacity in water.

The use of 7.82 parts of naphthalene-1,5-diisocyanate, or of 6.25 parts of hexamethylene diisocyanate per 100 parts of wax results in the formation of similar cross-linked plastics. It is thus possible to produce shaped articles by casting.

Example 7

100 parts of a polyglycolether prepared from trimethylol propane and ethylene oxide, which has a molecular weight of 4030, are reacted with 16.9 parts of naphthalene-1,5-diisocyanate after dehydration and addition of acetyl chloride as described in Example 5. In order to ensure to homogeneous melt the isocyanate is added at a temperature of 125–130° C. and after fusing the isocyanate the melt is heated to 80–100° C. for a further two hours while continuously stirring. The product obtained by the reaction is an isocyanate modified polyglycolether having three reactive isocyanate groups per one mol of polyglycolether. By applying this product in a thin layer from a 75 percent acetone solution to a glass plate, a rubber-elastic film which may be removed from the support is obtained after stirring at room temperature for one and a half to two hours. The film shows remarkable swelling properties which are determined by means of 0.25 mm. thick lamellae of an area of 9 cm.² by swelling at room temperature in the most various solvents which are listed in the table below. As measure for the swelling degree the quotient of the area of the swelled lamella (F) and the area of the lamella prior to swelling ($F_0$) is given in the table.

| Solvents | Swelling Quotient F/F₀ | |
|---|---|---|
| | Film of: polyglycolether, molecular weight 4030, +16.9 parts by weight of naphthalene-1,5-diisocyanate per 100 grams of polymer | Film of: polyglycolether, molecular weight 8950, +9.4 parts by weight of naphthalene diisocyanate per 100 grams of polymer |
| water | 2.05 | 2.90 |
| ethanol | 1.48 | 1.11 |
| methanol | 1.69 | 2.36 |
| acetone | 1.65 | 2.20 |
| diethyl ether | 1.17 | 1.03 |
| tetrachloride carbon | 1.48 | 1.20 |
| methylene chloride | 3.00 | 4.12 |
| dimethyl formamide | 2.67 | |
| benzene | 1.82 | 2.71 |
| gasoline | 1.03 | 1.00 |
| cyclohexane | | 1.00 |

Foils showing similar swelling properties may be obtained from the aforesaid polyglycolether and 13 parts of toluylene diisocyanate per 100 parts of wax. The reaction of such diisocyanate modified polyglycolether and atmospheric moisture is preferably carried out at moderately elevated temperatures, for instance at 50° C., since this isocyanate modified polyglycolether crystallizes at room temperature thus causing the formation of films with rough surfaces. This crystallinity is still more noticeable with isocyanate modified polyglycolether of higher molecular weight, for instance such obtained by reacting a polyglycolether of the molecular weight 8950, which is prepared from pentaerythrite and ethylene oxide, with 9.4 parts of naphthalene-1,5-diisocyanate per 100 parts of wax. The films produced from the latter type isocyanate modified polyglycolethers have more noticeable swelling properties (see table), however, without showing principal differences from the above described product produced by means of 60.9 parts of naphthalene-1,5-diisocyanate.

Example 8

100 parts of a polyglycolether of the molecular weight 4030, prepared by addition of ethylene oxide to trimethylol propane, are reacted with 0.5 percent of butadiene sulfone at 150° C. and 1 mm. Hg after dehydration for one hour. The major part of the butadiene sulfone has decomposed after 30 minutes. To remove volatile ingredients vacuum treatment is repeated for a short time until the melt is free of bubbles. Thereupon 14 parts of toluylene diisocyanate are added while continuously stirring at 80° C. and the reaction is completed by heating the melt at the same temperature for another hour. An isocyanate modified polyglycolether containing 3.2 percent of NCO groups is thus obtained. The product is stable provided that atmospheric moisture completely is excluded. Crystallisation occurs at room temperature, the product is liquid at moderately elevated temperatures. The free NCO groups render the isocyanate modified polyglycolether suitable for use as intermediate product in further reactions. The reaction of the product in thin layers with atmospheric moisture to form rubber-elastic films has been described in Example 7. Other effects are attained by stirring the product into water. For this purpose, a solution of the isocyanate in acetone or tetrahydrofuran is preferably employed. Presently after preparation of the aqueous solution the latter solidifies to an insoluble gel. The solidity of the gel increases with the quantity of the isocyanate modified polyglycolether used. When 4 percent of diisocyanate modified polyglycolether is employed a solid oil is obtained whereas 3 percent of diisocyanate modified polyglycolether causes the formation of a thickly viscous liquid. Gel formation is accompanied with the evolution of carbon dioxide which can be perceived by the formation of bubbles in the gel, especially when larger quantities of the isocyanate are used. The reaction can advantageously be adapted to the thickening of aqueous solutions or emulsions.

Example 9

The isocyanate modified polyglycolether obtained according to Example 8, which contains 3.2 percent of NCO groups, can successfully be employed in the manufacture of plastics. 100 parts of this isocyanate modified polyglycolether are reacted with 6.8 parts of dimethyl amino ethanol at 80° C. A polyglycolether containing terminal, tertiary nitrogen atoms is thus obtained. By mixing this basic intermediate product with 5 percent of 1,4-dichlorobutane a cross-linked, insoluble plastic is obtained in an exothermic reaction.

Example 10

100 parts of the isocyanate modified polyglycolether obtained according to Example 8, which contains 3.2 percent of NCO groups, is mixed with 2 percent of water and 2 percent of the prepared product by addition of phenyl isocyanate to N,N'-dimethyl amino ethanol at moderately elevated temperatures at which the product is present in a liquid form. The mass begins to expand by the action of carbon dioxide evolved from the free NCO groups and water, and eventually solidifies to an elastic cellular product. The product has the remarkable property of swelling in water to a material extent whereby an increase in molecular weight by 4 times the weight of the starting material was determined. After drying the swelled sponge the starting material is recovered.

Example 11

100 parts of an ethylene oxide polymer having the hydroxyl number 11.0 are dehydrated at 150° C. and 1 mm. Hg for one hour and intimately mixed after cooling to 80° C. with hexamethylene diisocyanate in quanities indicated in the table below. The mixture, which becomes distinctly more viscous already after 10 minutes, is filled into a container wherein the reaction is completed by heating to 80° C. for 8 hours. Products of high molecular weight which have higher viscosity numbers than the starting materials are obtained. All the products are soluble in water.

| Text No. | grams of hexamethylene diisocyanate per 100 grams of ethylene oxide polymer | viscosity number $z_\eta$ measured in water as solvent |
|---|---|---|
| untreated polymer | | .17 |
| 1 | 1.5 | 32.9 |
| 2 | 2.0 | 40.9 |

Example 12

250 parts of a polyglycolether of the hydroxyl number 58.0, which has been obtained by addition of ethylene oxide to pentaerythrite, are reacted with 0.725 part of acetyl chloride and thereafter with 40 parts of toluylene diisocyanate after dehydration by heating in vacuo at 50° C. The reaction is complete after 1 hour's stirring at 80° C. The resultant isocyanate modified polyglycolether contains 3.53 percent of NCO groups. The product shows the same properties, for instance in water, as the diisocyanate modified polyglycolether described in Example 8.

We claim:

1. The process which comprises reacting under substantially anhydrous conditions a polyalkylene ether glycol having a molecular weight greater than 1000 with a molar excess of a compound of the formula $$O=C=N-R-N=C=O$$

wherein R is hydrocarbon.

2. A process for making polymers which comprises reacting a polyalkylene ether of a saturated aliphatic hydrocarbon polyol, said polyalkylene ether having at least two hydroxyl groups per molecule and a molecular weight of at least about 500, and an organic isocyanate containing only hydrocarbon radicals and NCO.

3. The process of claim 2 wherein the said isocyanate is a diisocyanate.

4. The process of claim 2 wherein the said reaction occurs in the presence of an acidic substance.

5. The process of claim 2 wherein the reaction mixture contains a substance capable of engendering acid under the reaction conditions.

6. The process of claim 2 wherein the reaction mixture contains an excess of said isocyanate over that required to react with all of said hydroxyl groups.

7. A process for making polymers which comprises reacting a polyalkylene ether glycol having a molecular weight of at least about 500 and an organic isocyanate containing only hydrocarbon radicals and NCO.

8. The process of claim 7 wherein the said reaction occurs in the presence of an acidic substance.

9. The process of producing polymers which comprises reacting a polyalkylene ether of a saturated aliphatic hydrocarbon polyol, said polyalkylene ether having at least two hydroxyl groups per molecule, and a molecular weight of at least about 500, and an organic isocyanate containing at least two NCO groups, said isocyanate containing only hydrocarbon radicals and NCO, said isocyanate being present in the reaction mixture in an amount larger than that required for reacting with all of the hydroxyl groups of said ether, and reacting the resulting isocyanate-modified polyalkylene ether with a member selected from the group consisting of water and an organic compound containing at least two active hydrogen-containing groups in the molecule, said active hydrogen-containing groups being reactive with isocyanate groups.

10. The process of claim 9 wherein the active hydrogen-containing groups are selected from the group consisting of alcoholic hydroxyl groups, primary amino groups, and secondary amino groups.

11. The process of claim 9 wherein the reaction between the isoacyanate and the polyalkylene ether is conducted in the presence of an acidic substance.

12. The process of producing polymers which comprises reacting a polyalkylene ether glycol having a molecular weight of at least about 500, and an organic isocyanate containing at least two NCO groups, said isocyanate containing only hydrocarbon radicals and NCO, said isocyanate being present in the reaction mixture in an amount larger than that required for reacting with all of the hydroxyl groups of said ether, and reacting the resulting isocyanate-modified polyalkylene ether glycol with a member selected from the group consisting of water and an organic compound containing at least two active hydrogen-containing groups in the molecule, said active hydrogen containing groups being reactive with isocyanate groups.

13. A process for making polymers which comprises reacting a member selected from the group consisting of water and an organic compound containing at least two active hydrogen-containing groups in the molecule, said active hydrogen-containing groups being reactive with isocyanate groups, a polyalkylene ether of a saturated aliphatic hydrocarbon polyol, said polyalkylene ether having at least two hydroxyl groups per molecule and a molecular weight of at least about 500, and an organic isocyanate containing at least two NCO groups, said isocyanate containing only hydrocarbon radicals and NCO.

14. The process of claim 13 wherein the active hydrogen-containing groups are selected from the group consisting of alcoholic hydroxyl groups, primary amino groups, and secondary amino groups.

15. A process for making a cellular material which comprises reacting water, a polyalkylene ether of a saturated aliphatic hydrocarbon polyol, said polyalkylene ether having at least two hydroxyl groups per molecule and a molecular weight of at least about 500, and an organic isocyanate containing at least two NCO groups, said isocyanate containing only hydrocarbon radicals and NCO, said isocyanate being present in an amount in excess over that required to react with all of the hydroxyl groups of said polyalkylene ether.

16. The process of claim 15 wherein the polyalkylene ether has three hydroxyl groups per molecule.

17. The process of claim 15 wherein an acidic substance is present in the reaction mixture.

18. The process of claim 15 wherein an acid-engendering substance is present in the reaction mixture.

19. A synthetic polymer prepared by a process which comprises reacting a polyalkylene ether of a saturated aliphatic hydrocarbon polyol, said polyalkylene ether having at least two hydroxyl groups per molecule and a molecular weight of at least about 500, and an organic isocyanate containing only hydrocarbon radicals and NCO.

20. A synthetic polymer prepared by a process which comprises reacting a polyalkylene ether glycol having a molecular weight of at least about 500, and an organic isocyanate containing only hydrocarbon radicals and NCO.

21. A cellular polyurethane prepared by a process which comprises reacting water, a polyalkylene ether of a saturated aliphatic hydrocarbon polyol, said polyalkylene ether having at least two hydroxyl groups per molecule and a molecular weight of at least about 500, and an organic isocyanate containing at least two NCO groups, said isocyanate containing only hydrocarbon radicals and NCO, said isocyanate being present in an amount in excess over that required to react with all of the hydroxyl groups of said ployalkylene ether.

22. A cellular polyurethane prepared by a process which comprises reacting water, a polyalkylene ether of a saturated aliphatic hydrocarbon polyol, said polyalkylene ether having at least three hydroxyl groups per molecule and a molecular weight of at least about 500, and an organic isocyanate containing at least two NCO groups, said isocyanate containing only hydrocarbon radicals and NCO, said isocyanate being present in an amount in excess over that required to react with all of the hydroxyl groups of said polyalkylene ether.

23. A polymer prepared by a process which comprises reacting a polyalkylene ether of a saturated aliphatic hydrocarbon polyol, said polyalkylene ether having at least two hydroxyl groups per molecule and a molecular weight of at least about 500, water and an organic isocyanate containing at least two NCO groups, said isocyanate containing only hydrocarbon radicals and NCO.

24. A polymer prepared by a process which comprises reacting a member selected from the group consisting of water and an organic compound containing at least two active hydrogen-containing groups in the molecule, said active hydrogen-containing groups being reactive with isocyanate groups, a polyalkylene ether of a saturated aliphatic hydrocarbon polyol, said polyalkylene ether having at least two hydroxyl groups per molecule and a molecular weight of at least about 500, and an organic isocyanate containing at least two NCO groups, said isocyanate containing only hydrocarbon radicals and NCO.

25. The polymer of claim 24 wherein the active hydrogen containing groups are selected from the group consisting of alcoholic hydroxyl groups, primary amino groups, and secondary amino groups.

26. A polymer prepared by a process which comprises reacting under substantially anhydrous conditions a polyalkylene ether of a saturated aliphatic hydrocarbon polyol, said polyalkylene ether having at least two hydroxyl groups per molecule and a molecular weight of at least about 500 and a molar excess of an organic isocyanate containing at least two NCO groups, said isocyanate containing only hydrocarbon radicals and NCO.

27. The process of claim 2 wherein the isocyanate is toluylene diisocyanate.

28. The process of claim 2 wherein the isocyanate is naphthalene-1,5-diisocyanate.

References Cited in the file of this patent

UNITED STATES PATENTS

| | | |
|---|---|---|
| 1,922,459 | Schmidt et al. | Aug. 15, 1933 |
| 2,060,715 | Arvin | Nov. 10, 1936 |
| 2,266,777 | Lieser | Dec. 23, 1941 |
| 2,292,406 | Rothrock | Aug. 11, 1942 |
| 2,511,544 | Rinke et al. | June 13, 1950 |
| 2,531,392 | Breslow | Nov. 28, 1950 |
| 2,692,873 | Langerak et al. | Oct. 26, 1954 |
| 2,692,874 | Langerak | Oct. 26, 1954 |

FOREIGN PATENTS

| | | |
|---|---|---|
| 892,107 | France | Mar. 29, 1944 |
| 896,413 | Germany | Nov. 12, 1953 |

OTHER REFERENCES

Pinner: Plastics (London), May 1947, page 257.